United States Patent
Lusinchi et al.

(10) Patent No.: US 8,203,791 B2
(45) Date of Patent: Jun. 19, 2012

(54) IMAGE CAPTURING UNIT AND LENS ASSEMBLY

(75) Inventors: Jean-Pierre Lusinchi, Suzhou (CN); Xiao-Yun Kui, Suzhou (CN)

(73) Assignee: Ether Precision, Inc. (KY)

( * ) Notice: Subject to any disclaimer, the term of this patent is extended or adjusted under 35 U.S.C. 154(b) by 0 days.

(21) Appl. No.: 12/899,501

(22) Filed: Oct. 6, 2010

(65) Prior Publication Data

US 2011/0019282 A1  Jan. 27, 2011

Related U.S. Application Data

(62) Division of application No. 12/228,698, filed on Aug. 15, 2008, now Pat. No. 7,813,043.

(51) Int. Cl.
*G02B 27/10* (2006.01)
*G02B 7/02* (2006.01)

(52) U.S. Cl. .................... 359/619; 359/811; 359/819

(58) Field of Classification Search .................. 359/619, 359/811–824
See application file for complete search history.

(56) References Cited

U.S. PATENT DOCUMENTS

| | | | |
|---|---|---|---|
| 4,411,490 A | 10/1983 | Daniel |
| 4,416,513 A | 11/1983 | Uesugi |
| 4,432,022 A | 2/1984 | Tokumitsu |
| 4,473,284 A | 9/1984 | Hiramatsu et al. |
| 4,583,126 A | 4/1986 | Stoffel |
| 5,399,850 A | 3/1995 | Nagatani et al. |
| 5,444,520 A | 8/1995 | Murano |
| 5,570,231 A | 10/1996 | Mogamiya |
| 5,617,131 A | 4/1997 | Murano et al. |
| 5,661,540 A | 8/1997 | Kaihotsu et al. |
| 5,699,200 A | 12/1997 | Uno et al. |
| 6,002,459 A | 12/1999 | Kaise et al. |
| 6,449,106 B1 | 9/2002 | Spinali |
| 6,665,455 B1 | 12/2003 | Ting |
| 6,683,298 B1 | 1/2004 | Hunter et al. |
| 6,747,805 B2 | 6/2004 | Sayag |
| 6,809,868 B2 | 10/2004 | Ogi et al. |
| 6,822,803 B2 | 11/2004 | Muto et al. |
| 6,917,757 B1 | 7/2005 | Chang |
| 7,112,864 B2 | 9/2006 | Tsukamoto et al. |

(Continued)

FOREIGN PATENT DOCUMENTS

CN    1910754 A    2/2007

(Continued)

OTHER PUBLICATIONS

USPTO Office Action dated Aug. 5, 2010 in U.S. Appl. No. 12/490,297.

(Continued)

*Primary Examiner* — Mohammed Hasan
(74) *Attorney, Agent, or Firm* — Ashok K. Janah; Janah & Associates, P.C.

(57) ABSTRACT

A lens module array comprising a spacer plate comprising (i) first and second surfaces, and (ii) an array of lens barrels, each lens barrel comprising (1) a lens opening extending inward from the first surface of the spacer plate, and (2) a sensor cavity extending inward from the second surface of the spacer plate to meet the lens opening; and (b) at least one lens positioned over each lens opening of a lens barrel, the outer circumference of the lens being attached to the spacer plate.

28 Claims, 6 Drawing Sheets

U.S. PATENT DOCUMENTS

| | | |
|---|---|---|
| 7,116,484 B2 | 10/2006 | Nemoto et al. |
| 7,158,170 B2 | 1/2007 | Gustavsson et al. |
| 7,158,316 B2 | 1/2007 | Chang et al. |
| 7,166,907 B2 | 1/2007 | Onishi et al. |
| 7,177,082 B2 | 2/2007 | Wakisaka et al. |
| 7,187,501 B2 | 3/2007 | Wakisaka |
| 7,199,359 B2 | 4/2007 | Webster |
| 7,215,479 B1 | 5/2007 | Bakin |
| 7,262,927 B1 | 8/2007 | Shyu et al. |
| 7,330,211 B2 | 2/2008 | Vook et al. |
| 7,338,159 B2 | 3/2008 | Spivey |
| 7,352,511 B2 | 4/2008 | Boettiger et al. |
| 7,360,422 B2 | 4/2008 | Madni et al. |
| 7,375,893 B2 | 5/2008 | Toyoda |
| 7,379,113 B2 | 5/2008 | Kong et al. |
| 7,411,749 B2 | 8/2008 | Liu |
| 7,545,588 B2 | 6/2009 | Hua |
| 2002/0071190 A1 | 6/2002 | Wada et al. |
| 2002/0144905 A1 | 10/2002 | Schmidt |
| 2004/0061799 A1 | 4/2004 | Atarashi et al. |
| 2004/0095502 A1 | 5/2004 | Losehand et al. |
| 2004/0109079 A1* | 6/2004 | Fujimoto et al. ............. 348/340 |
| 2004/0227848 A1 | 11/2004 | Tan et al. |
| 2005/0041098 A1 | 2/2005 | Tan et al. |
| 2005/0162538 A1 | 7/2005 | Kurosawa |
| 2005/0275741 A1 | 12/2005 | Watanabe et al. |
| 2006/0035415 A1* | 2/2006 | Wood et al. .................. 438/125 |
| 2006/0043262 A1 | 3/2006 | Akram |
| 2006/0171047 A1 | 8/2006 | Yen et al. |
| 2006/0179887 A1 | 8/2006 | Lung et al. |
| 2006/0252246 A1 | 11/2006 | Paik et al. |
| 2007/0045517 A1 | 3/2007 | Fukuyoshi et al. |
| 2007/0069108 A1 | 3/2007 | Inaba |
| 2007/0139795 A1 | 6/2007 | Li |
| 2007/0186589 A1 | 8/2007 | Lung |
| 2007/0296847 A1 | 12/2007 | Chang et al. |
| 2008/0115880 A1 | 5/2008 | Chang |
| 2008/0121784 A1 | 5/2008 | Chang et al. |
| 2008/0158698 A1 | 7/2008 | Chang et al. |
| 2008/0309812 A1 | 12/2008 | Chen et al. |
| 2009/0116096 A1 | 5/2009 | Zalevsky et al. |
| 2010/0039713 A1 | 2/2010 | Lusinchi |

FOREIGN PATENT DOCUMENTS

| | | |
|---|---|---|
| TW | 095142246 | 11/2006 |
| TW | 095223188 | 12/2006 |
| TW | 096116333 | 5/2007 |
| TW | 096122374 | 6/2007 |
| WO | WO-03009040 A1 | 1/2003 |
| WO | WO-2007014293 A1 | 2/2007 |

OTHER PUBLICATIONS

USPTO Office Action dated Nov. 9, 2007 in U.S. Appl. No. 11/703,840 (US 7411749).

USPTO Office Action dated Jan. 7, 2010 in U.S. Appl. No. 11/774,646.

Kunnavakkam, et al., "Low-cost, low-loss microlens arrays fabricated by soft-lithography replication process", Applied Physics Letters, vol. 82, No. 8, pp. 1152-1154, Feb. 2003.

USPTO Final Office Action Dated Mar. 6, 2009 in U.S. Appl. No. 11/769,805 (US 2008-0158698 A1).

USPTO Office Action Dated Sep. 2, 2008 in U.S. Appl. No. 11/769,805 (US 2008-0158698 A1).

Lusinchi, Jean-Pierre, U.S. Appl. No. 12/490,297 (unpublished), entitled "Imaging device with focus offset compensation", filed Jun. 23, 2009. [same as ETOP.3].

USPTO Office Action Dated Jun. 10, 2009 in U.S. Appl. No. 11/640,249 (US 2008-0115880 A1).

USPTO Office Action Dated Aug. 28, 2008 in U.S. Appl. No. 11/640,257 (issued as US 7,545,588).

USPTO Office Action dated Feb. 23, 2009 in U.S. Appl. No. 11/925,742 (US 2008/0121784 A1). [in ETOP.01].

USPTO Office Action dated Nov. 27, 2009 in U.S. Appl. No. 11/925,742 (US 2008/0121784 A1). [in ETOP.01].

PCT International Search Report and Written Opinion from PCT Appl. No. PCT/CN2010/000918 (ETOP.3.PCT), Oct. 21, 2010, Beijing, China.

\* cited by examiner

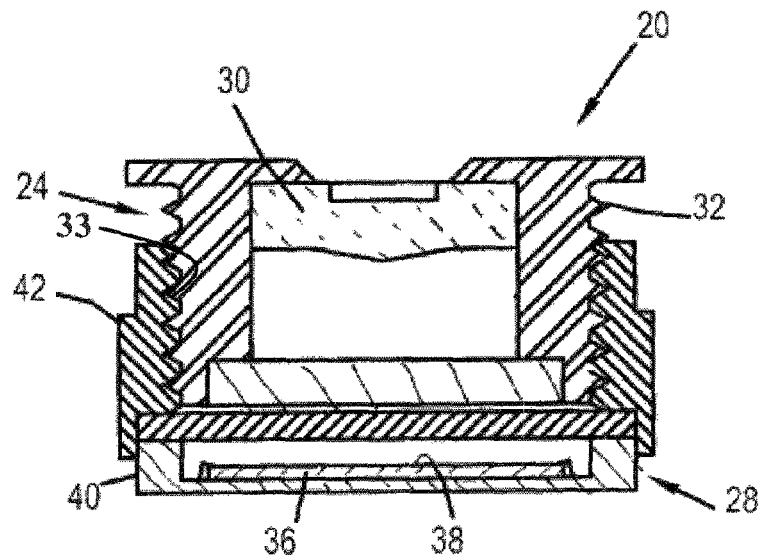
FIG. 1 (PRIOR ART)
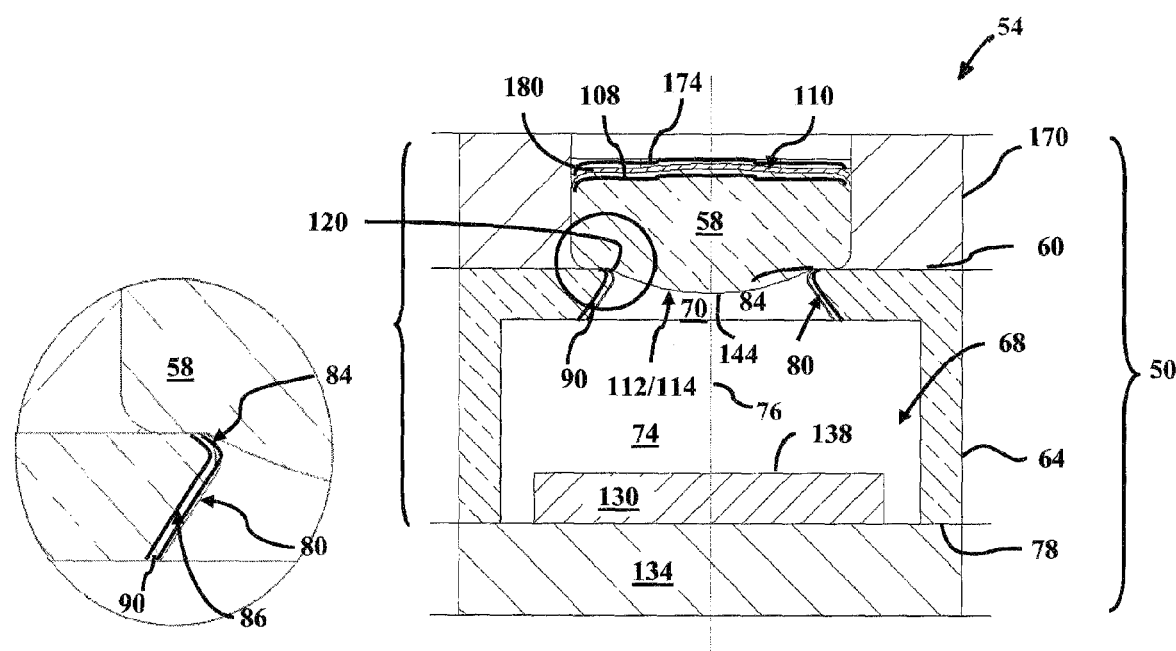
FIG. 2B  FIG. 2A

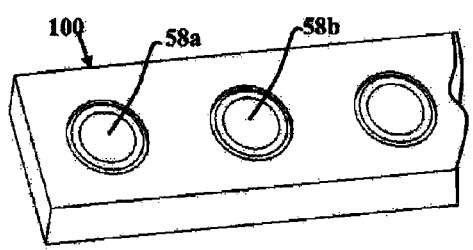 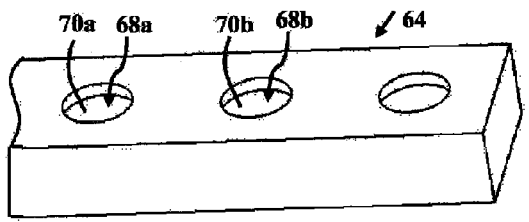
FIG. 4A  FIG. 4B
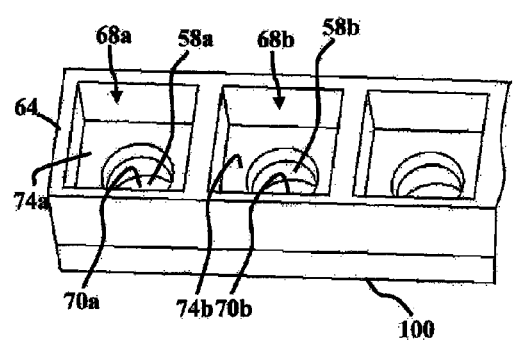 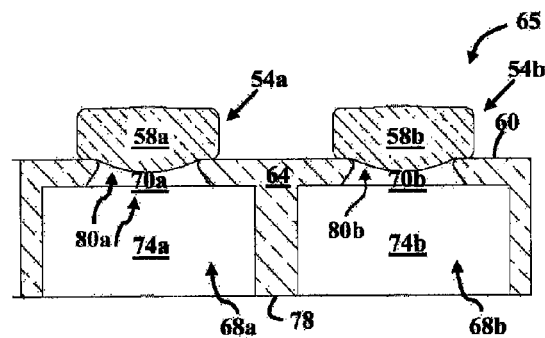
FIG. 4C  FIG. 4D
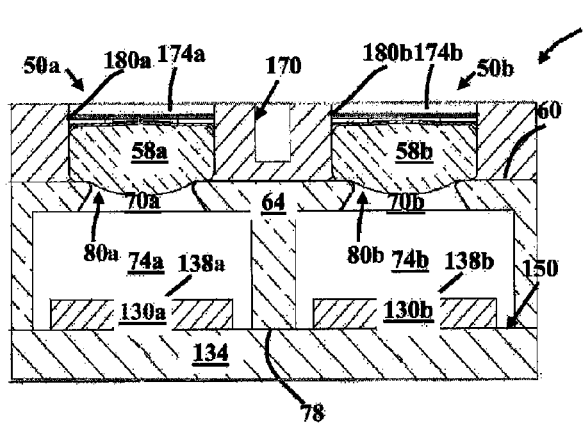 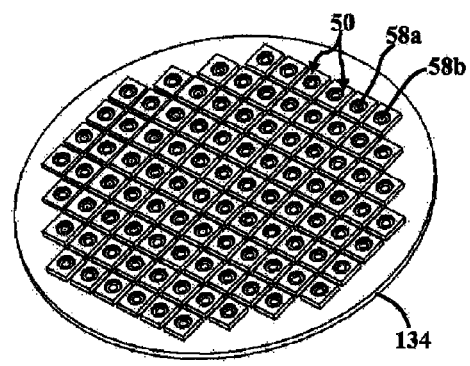
FIG. 4E  FIG. 4F

IMAGE CAPTURING UNIT AND LENS ASSEMBLY

CROSS-REFERENCE

This application claims priority from application Ser. No. 12/228,698, filed on Aug. 15, 2008 (U.S. Pat. No. 7,813,043), which is incorporated herein by reference in its entirety.

BACKGROUND

Embodiments of the present invention relate to an image capture unit comprising a lens and image sensor, and their methods of manufacture.

An image capturing unit 20 comprises a lens module 24 which directs an image onto an image sensor 28, as for example shown in FIG. 1. The lens module 24 comprises a lens 30 mounted in a lens barrel 32. The image sensor 28 can be a CCD or CMOS array 36 having an image receiving surface 38 that converts an incident image, which may be light, infrared or other radiation, into an electronic signal. Typically, the image sensor 28 is enclosed in a package 40 that is fabricated by chip on board (COB), tape carrier package (TCP), chip on glass (COG) methods, or Chip Scale Packaging (CSP), either with lateral connections or Through Silicon Via (TSV). A lens holder 42 joins and aligns the lens module 24 to the image sensor 28 in the package 40. The image capturing unit 20 is used, for example, in electronic devices such as mobile phones, personal digital assistants, remote sensors, signal transmitting cameras; medical devices; and applications such as a lens for a car security system.

It is difficult to cost effectively fabricate image capturing units 20 with ever smaller sizes as it becomes increasingly difficult to properly position or align the small lenses 30 relative to the image sensors 28. For example, each lens 30 has to be at a particular height above an image sensor 28 that reflects the focal length of the lens 30. During testing of an assembled unit, the height of lens 30 can be set by adjusting the height of the lens barrel 32 inside the lens holder 42 by turning it, either by automatic or manual means. However, this step requires the thread 33 to have a high degree of accuracy which provides incremental height adjustments that can be as small as 1 micron, without causing loss of centering of the lens 30 or tilting. Also, the height adjustment step adds time and labor costs to the alignment and assembly process.

It is also often difficult to align the axis of a lens 30 to be parallel to the central axis of a lens barrel 32 during assembly of the lens module 24. Alignment of these two axes renders the axis of the lens and barrel perpendicular to the image receiving surface 38 of the image sensor 28. However, even a slight degree of misalignment will cause the image generated by a lens 30 to become unfocused. Further, during assembly of each image capturing unit 20, each lens module 24 is manually positioned and attached to an image sensor 28, and alignment issues can also arise in this positioning step.

In addition, the unit assembly, lens alignment and height positioning steps should be accomplished while retaining structural integrity of the lens module 24 and image sensor 28. It is also desirable to have a reliable assembly process which provides good alignment of the lens modules 24 to the image sensors 28, a proper height of the lens 30, and does this in a cost effective manner.

SUMMARY

A lens module array comprises (a) a spacer plate comprising (i) first and second surfaces, and (ii) an array of lens barrels, each lens barrel comprising (1) a lens opening extending inward from the first surface of the spacer plate, and (2) a sensor cavity extending inward from the second surface of the spacer plate to meet the lens opening; and (b) at least one lens positioned over each lens opening of a lens barrel, the outer circumference of the lens being attached to the spacer plate.

A lens module array comprises (a) a spacer plate having first and second surfaces, and an array of lens barrels comprising lens openings separated from one another by a lens spacing distance, wherein each lens barrel comprises (i) a lens opening that extends inward from the first surface of the spacer plate, and comprising an orifice having a circumferential edge, and (ii) a sensor cavity that extends inward from the second surface of the spacer plate to meet the lens opening; and (b) at least one lens in each lens opening of the lens barrels, the lens having an outer circumference that is adhered to the circumferential edge of the orifice of the lens opening with an adhesive.

An image capturing unit comprises (a) a spacer plate comprising (i) first and second surfaces, and (ii) an array of spaced apart lens barrels, each lens barrel comprising a lens opening extending inward from the first surface, and a sensor cavity extending inward from the second surface; (b) a lens positioned in each lens opening of a lens barrel, each lens having an outer circumference that is attached to the spacer plate; and (c) a sensor positioned within the sensor cavity of each lens barrel.

DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

FIG. 1 (PRIOR ART) is a schematic sectional side view of a conventional image capturing unit comprising a lens module attached to an image sensor;

FIG. 2A is a schematic sectional side view of an image capturing unit of an image capturing unit array, the image capturing unit comprising a lens module aligned to an image sensor;

FIG. 2B is an inset detail of a lens opening contacting a lens as shown in FIG. 2A;

Figure 5:
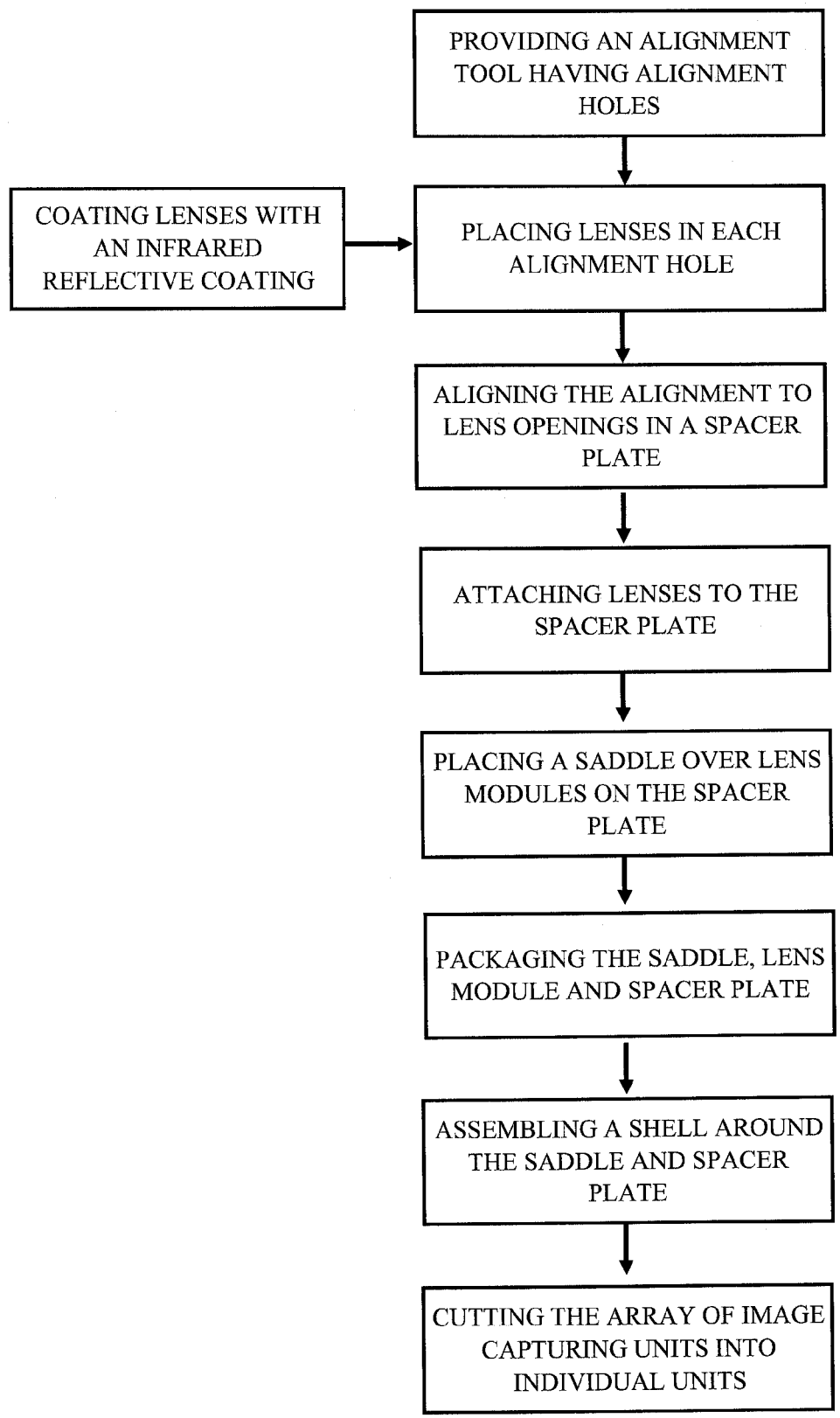

FIG. 3A to 3D are schematic sectional side views that show steps in the fabrication and assembly of an image capturing unit including (a) forming a spacer plate alignment tool containing alignment holes and having lenses in each alignment hole to contact the lenses to a spacer plate, (b) removing the tool to form a spacer plate having aligned lenses, (c) forming an individual lens module units by dicing the lens module array, and (d) forming an image capturing unit comprising an image sensor aligned to a lens module;

FIG. 4A to 4F comprises perspective views that show assembly of an image capturing unit including (a) an alignment tool containing alignment holes having lenses in each alignment hole, (b) the first surface of the spacer plate showing lens openings, (c) the second surface of the spacer plate showing sensor cavities, (d) a cross-sectional view of lenses attached to the lens openings of a spacer plate, (e) placement of a saddle having saddle openings over the lenses, and (f) a completed array of image capturing units that are ready to be diced;

FIG. 5 is a flow chart of a method of fabricating a plurality of image capture units using an alignment tool containing alignment holes having lenses in each alignment hole;

FIGS. 6A to 6E are schematic sectional side views of another embodiment of an image capturing unit array and fabrication process including views of (a) a spacer plate having lens barrels with lens openings and sensor cavities, (b) adhesive being sprayed through mask openings of a mask that shields the sidewall of the lens barrel, (c) inserting a lens in each sensor cavity to contact a lens opening, (d) inserting the alignment prongs of an alignment tool into the sensor cavity to align the lenses in the lens openings, and (e) removing the alignment tool, flipping over the lens module array, and aligning each lens barrel to an image sensor of an image sensor array on a sensor substrate.

DESCRIPTION

An embodiment of an image capturing unit 50 comprises a lens module 54 that includes at least one lens 58 attached to a spacer plate 64, as shown in FIG. 2A. The spacer plate 64 can be made from a dielectric, semiconductor or conductor material, which has a sufficient mechanical strength to support a lens 58. Suitable materials include, for example, glass such as silicate or borosilicate glass; ceramic such as aluminum oxide or silicon dioxide; metal such as titanium and stainless steel; semiconductor such as silicon wafers, gallium arsenide and indium phosphide; or even polymers such as plastic or polyimide and heat-resistant plastic. In one version, the spacer plate 64 comprises glass. The spacer plate 64 can be a unitary plate or a number of separate plates that are joined to one another by an adhesive to form the spacer plate 64, as for example, described in common assigned U.S. patent application Ser. No. 11/925,742, entitled "Image Capturing Unit and Methods", filed on Oct. 26, 2007, which is incorporated by reference herein and in its entirety.

Lens barrels 68 in the spacer plate 64 each comprise a lens opening 70 extending inward from a first surface 60 of the spacer plate 64, and a sensor cavity 74 that extends inward from a second surface 78 of the spacer plate 64 to meet the lens opening 70. The second surface 78 opposes the first surface 60. The lens opening 70 and sensor cavity 74 define the lens barrel 68 and have a common central axis 76. While an exemplary embodiment of a lens barrel 68 having a cylindrical axis of symmetry, such as the axis 76, is described herein to illustrate the present structures and processes, it should be understood that other lens barrel 68 configurations can also be used. For example, the lens barrel 68 can also be shaped to surround lens openings 70 or sensor cavities 74 that are rectangular, spherical, or even conical.

In one version, the lens opening 70 is formed to have a sidewall 80 having a complex multistep profile. The sidewall 80 is fabricated with a smooth internal surface for holding one or more lenses 58. The portion of the lens opening 70 that is in contact with a lens 58 is also coated with an opaque coating which is opaque to light. A section of the sidewall 80 (which may be a first step 84 of the sidewall 80) matches an outer contour of a lens 58 to allow self-alignment of a lens 58 that is placed into the lens barrel 68.

A suitable profile shape for the first step 84 comprises a curved or conical shape having a radius of curvature which fits the shape determined by the desired optical properties of the lens 58, as shown, for example, in FIG. 2A. The curvature can be generated by molding the lens opening 70 to have the desired shape of the sidewall 80 when the spacer plate 64 is made from a polymeric material, such as plastic, or by mechanical or ultrasonic etching when the spacer plate 64 is made from glass.

In one embodiment, the lens opening 70 further comprises a lower section 86 comprising a flange 87 to support a lens 58. In one version, the flange 87 is a conical flange and comprises an inclined surface that is inclined at an angle such that the light ray at maximum angle of light passing through the lens 58 does not touch the sidewall 80 of the lens opening 70. For example, a suitable conical flange can be sloped at an angle relative to the central axis 76 of the lens barrel 68. The conical flange gradually tapers outward (or inward), creating an internal profile contour having at least two consecutive diameters with a first portion having a first diameter and a second portion having a second diameter that is larger than the first diameter, or vice versa. In one version, the conical flange comprises a slope of from about 0 to about 30 degrees.

Another embodiment of an image capturing unit 50 comprises a spacer plate 64 having a first surface 60 and a second surface 78 and an array of lens barrels 68a,b, as shown in FIG. 6A-6D. Each lens barrel 68a,b comprises a lens opening 70a,b that extends inward from the first surface 60 of the spacer plate 64 and comprises a complex multi-step profile. In the version shown in FIG. 6A, the lens openings 70a,b each comprise first steps 84a,b and flanges 87a,b. When lenses 58a,b are inserted into the sensor cavities 74a,b, respectively, they each contact a sidewall 83a,b of the first steps 84a,b and rest on a support surfaces 88a,b of the flanges 87a,b. The sidewalls 83a,b each define a radially inner surface that can be a cylindrical, curved or conical shape. The radially inner surface can also be shaped to match or fit the outer perimeters of lenses 58a,b.

Figure 6A:
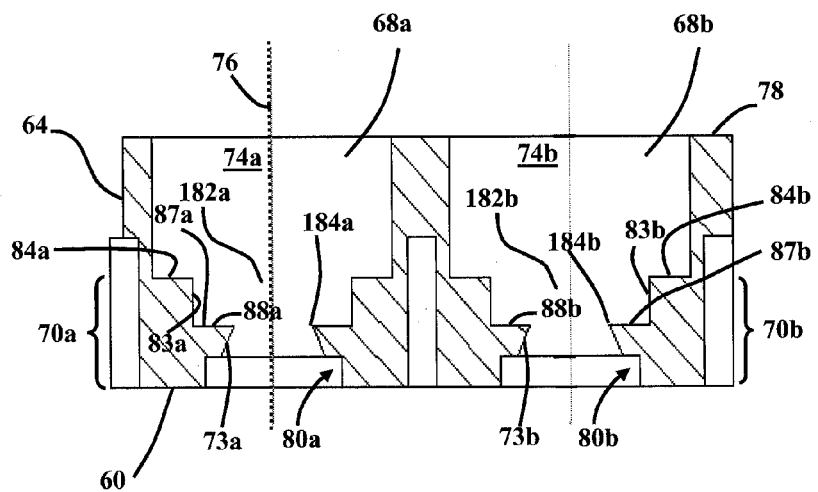

The sidewalls 83a,b of the first steps 84a,b each terminate at a support surface 88a,b of each flange 87a,b, and these surfaces 88a,b can be shaped to receive the lenses 58a,b and to act as alignment guides for positioning the lenses 58a,b in the lens openings 70a,b. The flanges 87a,b can each further comprise a radius of curvature which fits the shape determined by the desired optical properties of the lenses 58a,b. In the version of FIG. 6A, the flanges 87a,b of the lens openings 70a,b each terminate in an orifice 182a,b having the circumferential edges 184a,b, respectively. The circumferential edges 184a,b can each comprise sloped flanges having an angle of inclination of from about 2 to about 30 degrees.

Figure 6B:
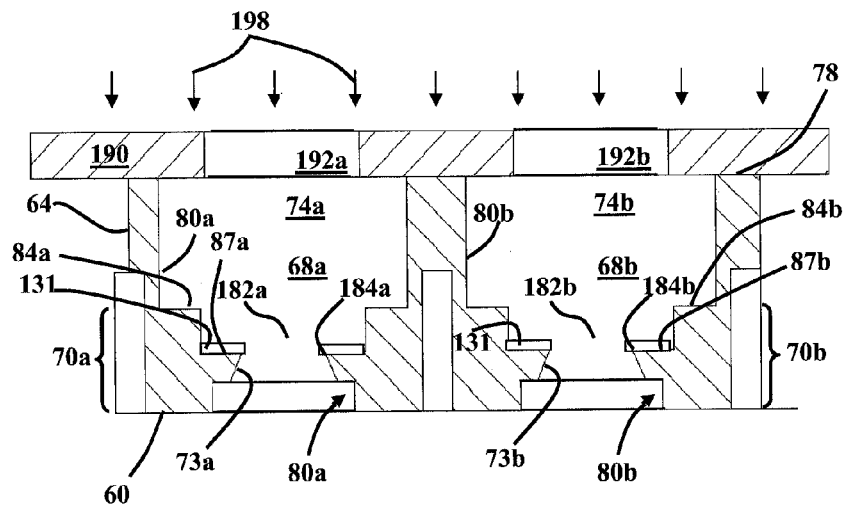

As shown in FIG. 6B, the lower sidewalls 80a,b of the lens openings 70a,b can each comprise a conical portion 73a,b having an angle of inclination of from about 2 to about 45 degrees. The conical portions 73a,b can be angles to extend outward from each orifice 182a,b. The conical portions 73a,b can comprise an angle of inclination that is selected in relation to the properties of the lenses 58a,b, the size of the sensor (not shown), the spacing between the lenses 58a,b and the sensor, or combinations thereof. For example, the angle of inclination of the conical portions 73a,b of the sidewalls 80a,b can be selected such that a light ray that is incident on the lenses 58a,b at the angle of inclination will be bent by the lenses 58a,b sufficiently far to fall on the sensor. In some lens configurations, the conical portions 73a,b of the sidewalls 80a,b can even allow the light collected by the lenses 58a,b to be collected from a wider solid angle as compared to a cylindrical sidewall.

A spacer plate 64 with a plurality of lens barrels 68a,b, versions of which are shown in FIGS. 4C, 4D and 6A, can be formed by a number of different methods. A mechanical or laser drill can be used to drill the through holes through the spacer plate 64. A suitable laser comprises a $CO_2$ or pulsed laser, such as Nd:YAG laser or excimer laser. The spacer plate 64 can also be fabricated by wet or dry etching the spacer plate 64 (or plates) to form the through holes. For example, a suitable wet etching process for etching the lens barrels 68 comprises masking each spacer plate 64 with a specific mask pattern, and dipping the spacer plate 64 in an acidic etchant, such as a dilute solution of HF. Lithography electroforming micro-molding (LIGA) is used to form the lens barrel 68 as would be apparent to one of ordinary skill in the art. When the spacer plate 64 is made of glass, the lens barrels 68a,b can also be made by etching the glass by sandblasting through a metal mask that has apertures corresponding to the diameters of the lens opening 70 and sensor cavity 74. Instead of sandblasting, ultrasonic etching can also be used.

In one method, the lens opening 70 and sensor cavities 74 are formed by drilling or etching the spacer plate 64 separately from both the first surface 60 and second surface 78 to predefined depths that correspond to the depths of the lens opening 70 or sensor cavity 74, respectively. For example, a plurality of lens openings 70 can be drilled from the first surface 60 to a first diameter and first depth. Thereafter, a plurality of sensor cavities 74 are drilled from the second surface 78 to a second diameter and second depth. Typically, the second diameter is larger than the first diameter, so that the circumference of the sensor cavity 74 extends radially beyond the circumference of the lens opening 70. The first diameter depends on the selected diameter of a lens 58 that is positioned in the lens openings 70. In one example, the second diameter is larger than the first diameter by at least about 10%, or even by about 30%. For example, the first diameter can be from about 0.5 mm to about 2.7 mm, and the second diameter can be from about 0.6 mm to about 3.0 mm. These different diameters reduce the lens opening to the minimum necessary for the light to reach the image sensor 130, and thus, provide better mechanical strength for the spacer plate 64.

After the lens barrels 68a,b are completed, an antireflective coating 90 can be deposited or formed on the sidewall 80 of each lens barrel 68. A suitable antireflective coating 90 comprises a layer—or a stack of layers—of light-refractive material. The antireflective coating 90 can be applied by vapor deposition, or by spray painting, sputtering, or oxidation of the surface of the material. The antireflective coating 90 can be formed to a thickness of at least about 50 microns, or even a thickness of from about 1 micron to about 100 microns.

Figure 3A:
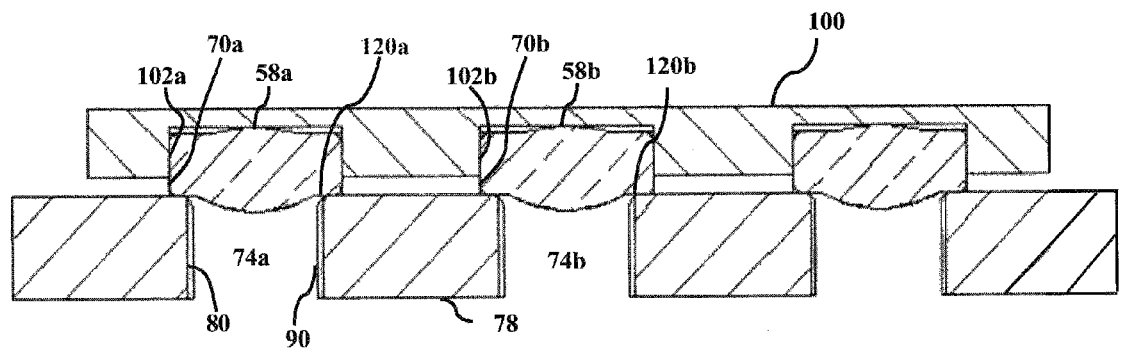

In one method of assembling the lenses 58a,b onto the lens openings 70a,b of the lens barrels 68a,b of the spacer plate 64, as shown in FIG. 3A to 3D and FIG. 4A, uses an alignment tool 100 comprising an array of alignment holes 102a,b that are spaced apart from one another by a distance that corresponds to, or is the same as, the spacing distance "d" between image sensors 130a,b of an image sensor array 150 on a sensor substrate 134 (as shown in FIG. 4E). The array of alignment holes 102a,b of the alignment tool 100 is aligned to and positioned over the lens openings 70a,b to allow placement and alignment of lenses 58a,b into the lens openings 70a,b, respectively. An exemplary set of operations is described in the flow chart of FIG. 5. In this process, at least one lens 58a,b is provided or placed in each alignment hole 102a,b of the alignment tool 100 to form a lens-filled alignment tool covering the lens openings 70a,b of the spacer plate 64, as shown in FIGS. 3A and 4A. The lens-filled alignment tool is aligned onto the first surface 60 of the spacer plate 64 such that each lens 58a,b is aligned to a corresponding lens opening 70a,b of a lens barrel 68a,b in the spacer plate 64. In this manner, at least one lens 58a,b is positioned over each lens opening 70a,b in a lens barrel 68a,b. In one version, the alignment 100 is made from a metal, such as aluminum, in a thickness of from about 150 to about 1000 microns.

The lenses 58 can be made of a transparent material, such as glass, polymer, or other materials. The focal length of the lens 58 and the opening size of the lens opening 70 combine to affect lens performance. The ratio between the focal length and the diameter of the lens opening 70 is called the aperture number. A suitable range of aperture number is from about 1.4 to about 3.2. For such aperture numbers, the lens 58 can have a focal length of from about 1 mm to about 5 mm. In one method, the lenses 58 are made of glass, which is molded into a suitable shape. The glass lenses 58 are typically more stable at high temperature environments than plastic lenses 58. Also, when the lenses 58 and spacer plate 64 are both made from glass, they provide a better thermal expansion match. The lenses 58 are typically made from high purity glass, but can also be made from other optical materials, such as epoxy or polycarbonate.

Each lens 58 can also have an infrared reflective coating 108 on a top surface 110 to reflect and/or attenuate infrared radiation from passing through the lens 58, as shown in FIG. 2A. Typically, the infrared reflective coating 108 is provided on the top surface 110 of the lens 58, as shown, but can also be formed on the bottom surface 112. A suitable infrared reflective coating 108 comprises a plurality of metal oxide layers that form an interferometric filter. Conventional infrared reflective coatings 108 can be used.

An antireflective coating 114 can also be formed on a second surface of each lens 58 which faces the image sensor 130. The antireflective coating 114 is provided on the bottom surface of the lens 58 to prevent back reflections from the image sensor 130. This is desirable to reduce the reflection of parasitic light from surrounding surfaces, which in turn can cause ghosts and flares to occur on the image plane of the image sensor 130. A conventional antireflective coating 114 comprises successive layers of metal oxide that form an interference filter, which filters light reflected onto it. In another version, the antireflective coating 114 comprises successive layers of transparent material with different refractive indices which provide a change from the refractive index of air to the refractive index of the lens 58.

The lenses 58a,b are attached at their outer circumferences 120a,b to the spacer plate 64, as shown in FIGS. 3A and 4D. The outer circumference 120a,b of each lens 58a,b extends beyond a diameter of the lens opening 70a,b at the first surface 60 of the spacer plate 64 to provide a suitable attachment region at which the lenses 58a,b are attached. The lenses 58a,b can be attached with an adhesive 131, such as an epoxy glue or cyanoacrylate glue. The adhesive 131 can also include an opaque filler such as carbon powder. The alignment tool 100 remains in place until the adhesive 131 has set and has the necessary mechanical strength to hold the lenses 58a,b in position. The adhesive 131 can be sprayed onto the surface of the spacer plate 64 before the lenses 58a,b are inserted into the lens openings 70a,b to further facilitate assembly.

Figure 3B:
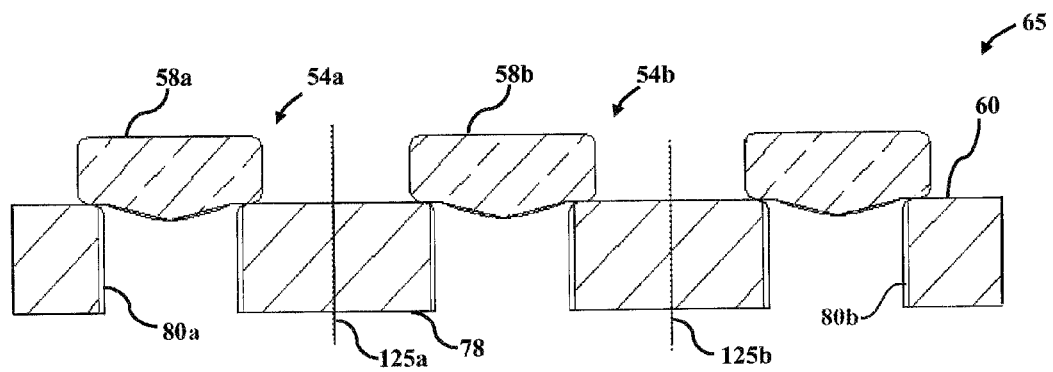
Figures 3C, 3D:
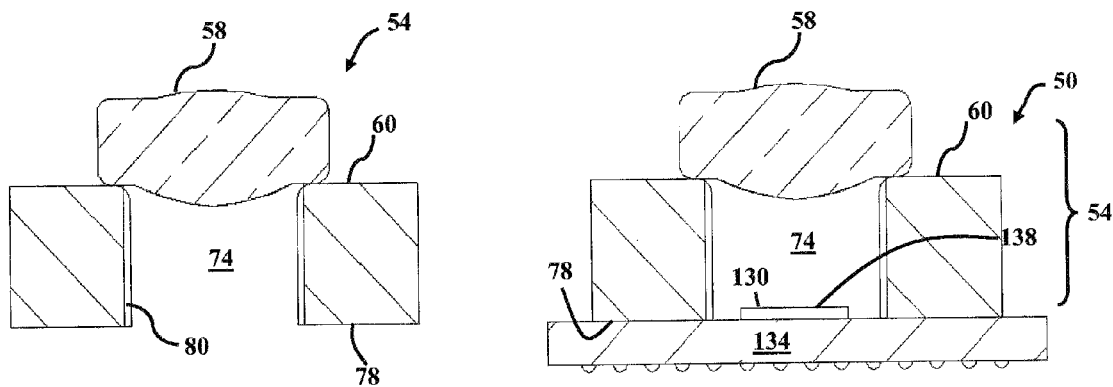

After the outer circumferences 120a,b of the lenses 58a,b are attached to the first surface 60 of the spacer plate 64, the alignment tool 100 is removed from the spacer plate 64 to form a lens module array 65 comprising an array of lens modules 54a,b that are spaced apart from one another in a periodic relationship, and each comprise a lens 58a,b adhered to the spacer plate 64. The spacing between the lens modules 54a,b matches the spacing distance or period of image sensors 130a,b of an image sensor array 150, as shown in FIGS. 3B and 4E. The spacer plate 64 with its lens modules 54a,b can then be cut along the axes 125a,b as shown in FIG. 3B to form individual lens modules 54a,b as shown in FIG. 3C.

In another version, the spacer plate 64 with each of its lens modules 54a,b, as shown in FIG. 4D, is directly aligned to an image sensor array 150 such that each lens module 54a,b is aligned to an image sensor 130a,b on the sensor substrate 134 to form the structure shown in FIG. 4E. The image sensor array 150 comprises a plurality of image sensors 130a,b which are spaced apart by a spacing distance "d" from one another and arranged in a periodic arrangement. Each image sensor 130a,b comprises an image receiving surface 138a,b which receives radiation from an external image on the image receiving surface 138 and converts the received image to an electrical signal trace for further processing. The image receiving surface 138 of the image sensor 130 is aligned directly underneath a lens 58 such that the image sensor 130 is contained within the sensor cavity 74 as shown in FIGS. 2A and 3D. The sensor substrate 134 can be a printed circuit board or a semiconductor wafer, such as a silicon wafer or compound semiconductor, such as gallium arsenide. Typically, the image sensor 130 is enclosed in a package (not shown) and can be fabricated by conventional chip on board (COB), tape carrier package (TCP), chip on glass (COG), or chip scale package (CSP) methods, either with lateral connections or realized in a Through Silicon Via (TSV) technology.

This alignment process, in which the lens module array 65 is aligned to the corresponding image sensor array 150 provides a more efficient manufacturing process than assembling single image capturing units 50 from single lens modules 54 and image sensors 130. The resultant assembly, shown in FIG. 4F, can be cut or diced to form individual image capturing units 50a,b. Suitable cutting processes include mechanical cutting, laser cutting or electrical discharge machining.

Referring to FIG. 4F, before or after joining the lens module array 65 to the image sensor array 150, a saddle 170, made from an opaque material and having an array of saddle openings 174a,b that are each sized to fit around a lens 58a,b, is placed on the spacer plate 64 and positioned over the lenses 58a,b (as shown in FIG. 4E) and attached with an adhesive. The saddle 170 serves to support the lens modules 54a,b during separation of the lens modules 54a,b from the spacer plate 64. The saddle openings 174a,b are each aligned with a lens 58a,b of the spacer plate 64. The resultant structure forms a plurality of individual image capturing units 50a,b. The sidewalls of the saddle 170 can also have an antireflective coating as described above. The saddle 170 can be made from a polymer.

Each saddle opening 174a,b can also contain a lens cover plate 180a,b, respectively, to protect the underlying lenses 58a,b, as shown in FIG. 2A and FIG. 4E. The lens cover plate 180a,b is substantially permeable to radiation, such as optical wavelengths of light, or other types of radiation. For example, the lens cover plates 180a,b can allow at least 90% of normally incident light to pass through. In one version, the lens cover plates 180a,b reduce moisture or dust contamination of the lenses 58a,b. The lens cover plates 180a,b can be a plate of light-permeable material, for example, glass or plastic. The lens cover plates 180a,b can also serve as a radiation filter, such as an infrared filter, which absorbs at least about 30% of radiation having wavelengths in the infrared range.

The image capturing unit 50 formed by a lens module 54 containing one or more lenses 58 and an image sensor 130 on a sensor substrate 134, which are aligned to have a common axis, can be used in a variety of different devices.

Figure 6C:
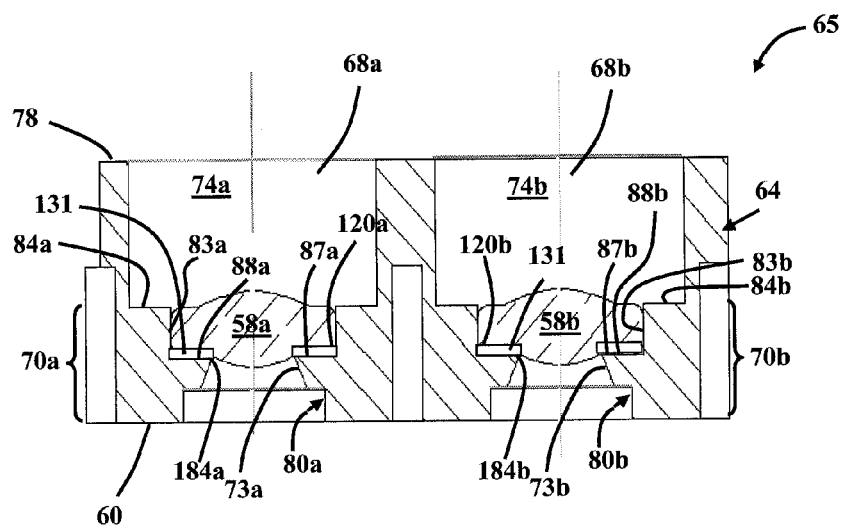

Another embodiment of a process of fabricating an image capturing unit 50 is shown in FIGS. 6A to 6D. An adhesive 131 is applied to the support surfaces 88a,b of flanges 87a,b of the lens openings 70a,b to adhere the lenses 58a,b which are placed in contact with the support surfaces 88a,b of the flange 87a,b, respectively. In one method of applying the adhesive 131, a mask 190 is placed on the second surface 78 of the spacer plate 64 to mask the sidewalls 80a,b of the sensor cavities 74a,b as shown in FIG. 6B. The mask 190 has holes 192a,b which are arranged in a periodic relationship that corresponds to the lens spacing of the lens openings 70a,b. A suitable mask 190 can be made from aluminum. Thereafter, an adhesive 198 is sprayed through the mask holes 192a,b of the mask 190 to form the adhesive coating 131 on the support surfaces 88a,b of the flanges 87a,b and on the circumferential edges 184a,b of the orifices 182a,b. When the adhesive 198 is sprayed through the mask holes 192a,b, it falls upon and coats the support surfaces 88a,b and circumferential edges 184a,b to selectively apply the adhesive only at these regions. Thereafter, at least one lens 58a,b is inserted in each sensor cavity 74a,b, as shown in FIG. 6C, so that an outer circumference 120a,b of the lens 58a,b rests on the adhesive 131 in this region.

Figure 6D:
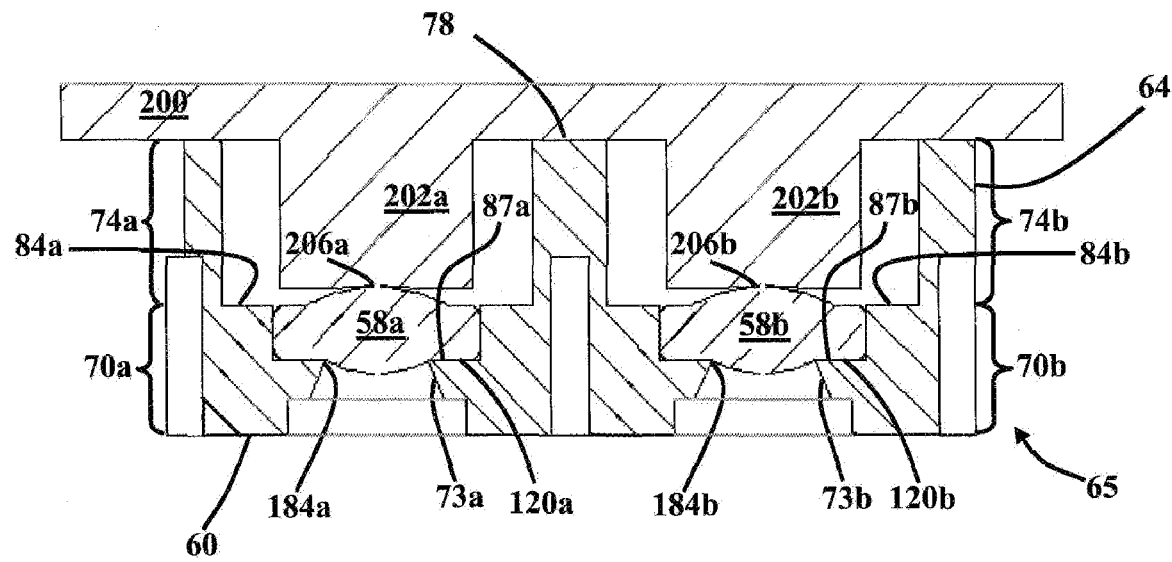

An alignment tool 200 is then used to align the lenses 58a,b in the orifices 182a,b. The alignment tool 200 comprises alignment prongs 202a,b which are inserted into the sensor cavities 74a,b as shown in FIG. 6D. The alignment prongs 202a,b of the lens module array 65 are separated from one another by the lens spacing distance. Each alignment prong 202a,b aligns a lens 58a,b to an orifice 182a,b. The alignment tool 200 can be made from a metal and, in one version, can have from about 100 to about 5000 prongs. The alignment prongs 202a,b are shaped and sized to align the lenses 58a,b to the orifices 182a,b. The length of the alignment prongs 202a,b corresponds to the distance between an apex 206a,b of the lenses 58a,b and the second surface 78 of the spacer plate 64 to set the distance between the surface 78 and the apexes 206a,b of the lenses 58a,b to the proper length. In one version, each of the prongs 202a,b comprises a length of from about 0.5 to about 5 mm.

Figure 6E:
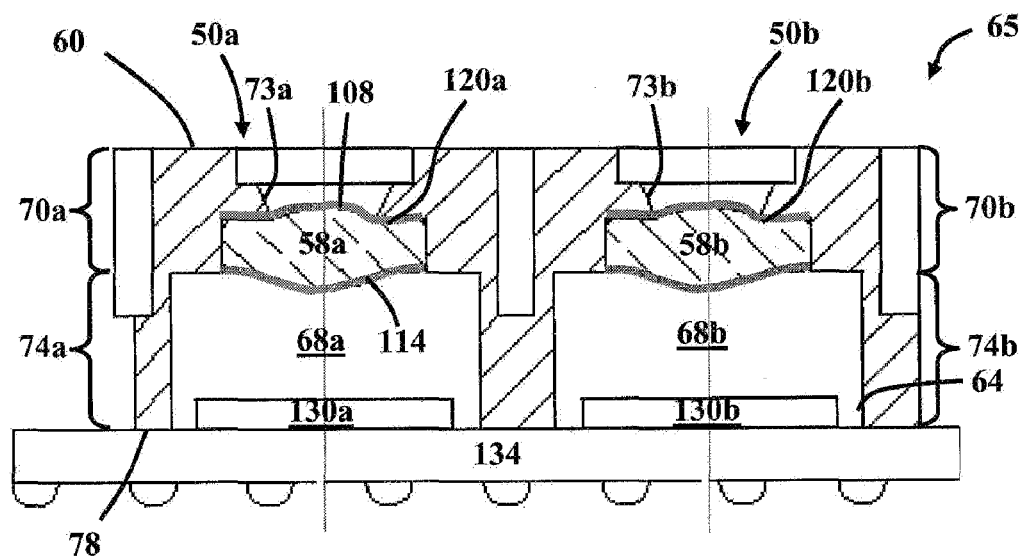

The alignment tool 200 is then removed from the spacer plate 64 to form a lens module array 65 comprising lens modules 54a,b that each comprise a lens 58a,b adhered to orifices 182a,b of a lens opening 70a,b of a lens barrel 68a,b of the spacer plate 64. The lens module array 65 is flipped over and each lens module 54a,b is aligned to an image sensor 130a,b of an image sensor array 150 on a sensor substrate 134 as shown in FIG. 6E. Each lens 58a,b can also have an infrared reflective coating 108 and an antireflective coating 114, as previously described. The resultant assembly can be diced to form individual image capturing units 50a,b. Suitable cutting processes include mechanical cutting, laser cutting or electrical discharge machining.

While illustrative embodiments of the spacer plate 64, lens barrel 68 and image capturing unit 50 are described in the present application, it should be understood that other embodiments are also possible. For example, other designs for the lens barrel 68 and spacer plate 64 can be used. Also, the lens module 54 can be packaged with other types of image capturing modules, depending on the application. Thus, the scope of the claims should not be limited to the illustrative embodiments described herein.

What is claimed is:

1. A lens module array comprising:
    (a) a spacer plate comprising:
        (i) first and second surfaces, and
        (ii) an array of lens barrels, each lens barrel comprising:
            (1) a lens opening extending inward from the first surface of the spacer plate, the lens opening comprising a conical flange and sidewall and
            (2) a sensor cavity extending inward from the second surface of the spacer plate to meet the lens opening; and (b) at least one lens positioned over each lens opening of each lens barrel, the outer circumference of the lens being attached to the spacer plate.

2. A lens module array according to claim 1 wherein each lens opening of each lens barrel of the spacer plate comprises a sidewall having a profile that matches the contour of a lens.

3. A lens module array according to claim 1 wherein the angle of the conical flange is such that a light ray at a maximum angle of light passing through a lens positioned in the lens opening does not touch the sidewall.

4. A lens module array according to claim 1 wherein the conical flange is sloped at an angle relative to a central vertical axis of the lens of from about 0 degrees to about 30 degrees.

5. A lens module array according to claim 1 wherein the spacer plate comprises glass.

6. A lens module array according to claim 1 wherein each lens comprises an outer circumference that extends beyond a diameter of the associated lens opening of the lens barrel of the spacer plate to provide an attachment region for attaching the lens to the spacer plate.

7. A lens module array according to claim 6 wherein each lens is attached to the spacer plate at the attachment region.

8. A lens module array according to claim 7 wherein each lens is attached to the spacer plate with an adhesive.

9. A lens module array according to claim 1 wherein each lens comprises a first surface having an infrared reflective coating.

10. A lens module array according to claim 9 wherein each lens comprises a second surface having an antireflective coating.

11. A lens module array according to claim 1 wherein the spacer plate and lenses are made from glass.

12. A lens module array comprising:
(a) a spacer plate having first and second surfaces, and an array of lens barrels comprising lens openings separated from one another by a lens spacing distance, wherein each lens barrel comprises:
  (i) a lens opening that extends inward from the first surface of the spacer plate, the lens opening comprising a sloped flange and sidewall and an orifice having a circumferential edge, and
  (ii) a sensor cavity that extends inward from the second surface of the spacer plate to meet the lens opening; and
(b) at least one lens in each lens opening of each lens barrel, the lens having an outer circumference that is adhered to the circumferential edge of the orifice of the lens opening with an adhesive.

13. A lens module array according to claim 12 wherein the sloped flange comprises an angle of inclination of from about 2 to about 30 degrees.

14. A lens module array according to claim 12 wherein each lens comprises a first surface having an infrared reflective coating.

15. A lens module array according to claim 14 wherein each lens comprises a second surface having an antireflective coating.

16. A lens module array according to claim 12 wherein the spacer plate and lenses are made from glass.

17. An image capturing unit comprising:
(a) a spacer plate comprising:
  (i) first and second surfaces, and
  (ii) an array of spaced apart lens barrels, each lens barrel comprising (i) a lens opening extending inward from the first surface, each lens opening comprising a conical flange and sidewall, and (ii) a sensor cavity extending inward from the second surface;
(b) a lens positioned in each lens opening of each lens barrel, each lens having an outer circumference that is attached to the spacer plate; and
(c) a sensor positioned within the sensor cavity of each lens barrel.

18. An image capturing unit according to claim 17 wherein each lens opening of each lens barrel of the spacer plate comprises a sidewall having a profile that matches the contour of a lens.

19. An image capturing unit according to claim 17 wherein the angle of the conical flange is such that a light ray at a maximum angle of light passing through a lens positioned in the lens opening does not touch the sidewall.

20. An image capturing unit according to claim 17 wherein the conical flange is sloped at an angle relative to a central vertical axis of the lens of from about 0 degrees to about 30 degrees.

21. An image capturing unit according to claim 17 wherein the spacer plate comprises glass.

22. An image capturing unit according to claim 17 wherein the outer circumference of each lens extends beyond a diameter of the associated lens opening of a lens barrel in the spacer plate to provide an attachment region for attaching the lens to the spacer plate.

23. An image capturing unit according to claim 17 wherein each lens is attached to the spacer plate with an adhesive.

24. An image capturing unit according to claim 17 wherein each lens comprises a first surface having an infrared reflective coating.

25. An image capturing unit according to claim 24 wherein each lens comprises a second surface having an antireflective coating.

26. An image capturing unit according to claim 17 wherein the spacer plate and lenses are made from glass.

27. An image capturing unit according to claim 17 comprising a saddle having an array of saddle openings that are each sized to fit around a lens.

28. An image capturing unit according to claim 27 comprising a lens cover plate over the saddle.

* * * * *